US011700163B2

(12) United States Patent
Takahashi et al.

(10) Patent No.: US 11,700,163 B2
(45) Date of Patent: Jul. 11, 2023

(54) MODULATION FORMAT ESTIMATION DEVICE, AND MODULATION FORMAT ESTIMATION METHOD

(71) Applicant: NEC Corporation, Tokyo (JP)

(72) Inventors: Kiyohiko Takahashi, Tokyo (JP); Kaoru Kishimoto, Tokyo (JP); Toshiki Takeuchi, Tokyo (JP); Taichi Ohtsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/410,064

(22) Filed: Aug. 24, 2021

(65) Prior Publication Data

US 2022/0070046 A1    Mar. 3, 2022

(30) Foreign Application Priority Data

Aug. 28, 2020    (JP) .................................. 2020-144856

(51) Int. Cl.
*H04L 27/38* (2006.01)
*G06N 20/00* (2019.01)
*H04L 27/00* (2006.01)
*H04L 27/36* (2006.01)

(52) U.S. Cl.
CPC ........... *H04L 27/364* (2013.01); *G06N 20/00* (2019.01); *H04L 27/0012* (2013.01); *H04L 27/0014* (2013.01); *H04L 27/3854* (2013.01); *H04L 2027/0065* (2013.01)

(58) Field of Classification Search
CPC ............ H04L 27/0012; H04L 27/0014; H04L 2027/0024; H04L 2027/0034; H04L 27/364; H04L 27/385; H04L 27/22; G06N 20/00
See application file for complete search history.

(56) References Cited

U.S. PATENT DOCUMENTS 10,003,483 B1 * 6/2018 Migliori .............. H04L 27/0012
2020/0044899 A1 * 2/2020 Chen ...................... G06N 3/084
2020/0327397 A1 * 10/2020 Govea .................... G06N 3/045

FOREIGN PATENT DOCUMENTS

JP          2006-211760 A       9/2008

* cited by examiner

*Primary Examiner* — Betsy Deppe

(57) ABSTRACT

A modulation format estimation device 100 includes: a frequency shift correction unit 112 configured to estimate the amount of a frequency shift using a baseband signal acquired from a received signal and correct the baseband signal based on an estimation result; a frequency error generation unit 122 configured to generate a plurality of frequency errors from a range set based on an error occurring in the estimation of the frequency shift amount; a frequency error introduction unit 123 configured to acquire learning baseband signals in which each of a plurality of source signals modulated by different modulation formats is frequency-shifted by each frequency error; and a modulation format estimation unit 113 configured to input a corrected baseband signal to a first machine learning model created by machine learning using learning data including the plurality of learning baseband signals and a label, and estimate a modulation format of the received signal.

7 Claims, 13 Drawing Sheets

MODULATION FORMAT ESTIMATION DEVICE, AND MODULATION FORMAT ESTIMATION METHOD

INCORPORATION BY REFERENCE

This application is based upon and claims the benefit of priority from Japanese patent application No. 2020-144856, filed on Aug. 28, 2020, the disclosure of which is incorporated herein in its entirety by reference.

TECHNICAL FIELD

The present disclosure relates to a modulation format estimation device, a modulation format estimation method, and a program therefor.

BACKGROUND ART

In unlicensed radio wave monitoring and cognitive radio, unknown communication signals are detected and analyzed from a wide frequency band to be monitored. A modulation format estimation of a communication signal is an important task that leads to identification of a sender, but needs to be performed together with estimation of a center frequency because the target is an unknown signal. Further, it is also necessary to analyze radio waves such as burst signals with a short signal length burst. Japanese Unexamined Patent Application Publication No. 2008-211760 discloses a related technique.

SUMMARY

A pilot signal or the like used for a center frequency and frequency correction is known in normal communication, but in unlicensed radio wave monitoring and cognitive radio, it is necessary to estimate a modulation format for a signal whose pilot signal or the like is unknown. Here, when the center frequency of the signal to be monitored cannot be accurately grasped, there is a problem in that characteristics of the modulation format is difficult to be grasped. Hereinafter, the problem will be described in detail with reference to FIGS. 1 and 2.

FIGS. 1 and 2 are graphs in which a baseband signal acquired from a signal modulated by a quadrature phase shift keying (QPSK) system is displayed on a complex plane. In a device that receives a signal to be monitored, when a received signal is converted into a baseband signal, a center frequency of the received signal and a center frequency of a band to be converted into a baseband are matched. FIG. 1 shows an example of displaying a baseband signal when two center frequencies are exactly matched. FIG. 2 shows an example of displaying a baseband signal when two center frequencies have an error of about 1% with respect to a modulation bandwidth. From FIG. 1, it is possible to read four-point constellation, which is a characteristic of a signal modulated by the QPSK system. However, in FIG. 2, characteristics have changed significantly, and it is difficult to read that the modulation format is QPSK.

The present disclosure is made to solve such a problem. In other words, the present disclosure is to provide a modulation format estimation device, a method, and a program capable of estimating a modulation format of a radio signal having an unknown center frequency at high speed and with high accuracy.

A modulation format estimation device of an example embodiment includes: a frequency shift correction unit configured to estimate the amount of a frequency shift using a baseband signal acquired from a received signal of which modulation format is unknown and correct the baseband signal based on an estimation result; a frequency error generation unit configured to generate a plurality of frequency errors from a range set based on an error occurring in the estimation of the frequency shift amount; a frequency error introduction unit configured to acquire a plurality of learning baseband signals in which each of a plurality of source signals modulated by different modulation formats is frequency-shifted by each frequency error; and a modulation format estimation unit configured to input a baseband signal corrected by the frequency shift correction unit to a first machine learning model created by machine learning using learning data including the plurality of learning baseband signals and a label indicating a modulation format of each of the learning baseband signals, and estimate a modulation format of the received signal based on an output result for the input.

A modulation format estimation method of an example embodiment includes: a frequency shift correction step of estimating the amount of a frequency shift using a baseband signal acquired from a received signal of which modulation format is unknown, and correcting the baseband signal based on an estimation result; a frequency error generation step of generating a plurality of frequency errors from a range set based on an error occurring in the estimation of the frequency shift amount; a frequency error introduction step of acquiring a plurality of learning baseband signals in which each of a plurality of source signals modulated by different modulation formats is frequency-shifted by each frequency error; and a modulation format estimation step of inputting a baseband signal corrected by the frequency shift correction step to a first machine learning model created by machine learning using learning data including the plurality of learning baseband signals and a label indicating a modulation format of each of the learning baseband signals, and estimating a modulation format of the received signal based on an output result for the input.

A modulation format estimation program of an example embodiment causes a computer to execute: a frequency shift correction step of estimating the amount of a frequency shift using a baseband signal acquired from a received signal of which modulation format is unknown, and correcting the baseband signal based on an estimation result; a frequency error generation step of generating a plurality of frequency errors from a range set based on an error occurring in the estimation of the frequency shift amount; a frequency error introduction step of acquiring a plurality of learning baseband signals in which each of a plurality of source signals modulated by different modulation formats is frequency-shifted by each frequency error; and a modulation format estimation step of inputting a baseband signal corrected by the frequency shift correction step to a first machine learning model created by machine learning using learning data including the plurality of learning baseband signals and a label indicating a modulation format of each of the learning baseband signals, and estimating a modulation format of the received signal based on an output result for the input.

A modulation format estimation device of an example embodiment includes: a frequency error generation unit configured to generate a plurality of frequency errors from a range set based on an error occurring in an estimation of the amount of a frequency shift using a baseband signal acquired from a received signal of which modulation format is unknown; a frequency error introduction unit configured to acquire a plurality of learning baseband signals in which each of a plurality of source signals modulated by different modulation formats is frequency-shifted by each frequency error; and a modulation format learning unit configured to create a first machine learning model by machine learning using learning data including the plurality of learning baseband signals and a label indicating a modulation format of each of the learning baseband signals.

BRIEF DESCRIPTION OF DRAWINGS

The above and other aspects, features, and advantages of the present disclosure will become more apparent from the following description of certain exemplary embodiments when taken in conjunction with the accompanying drawings, in which.

EMBODIMENTS (Examination Leading to Example Embodiments)

Figure 1:
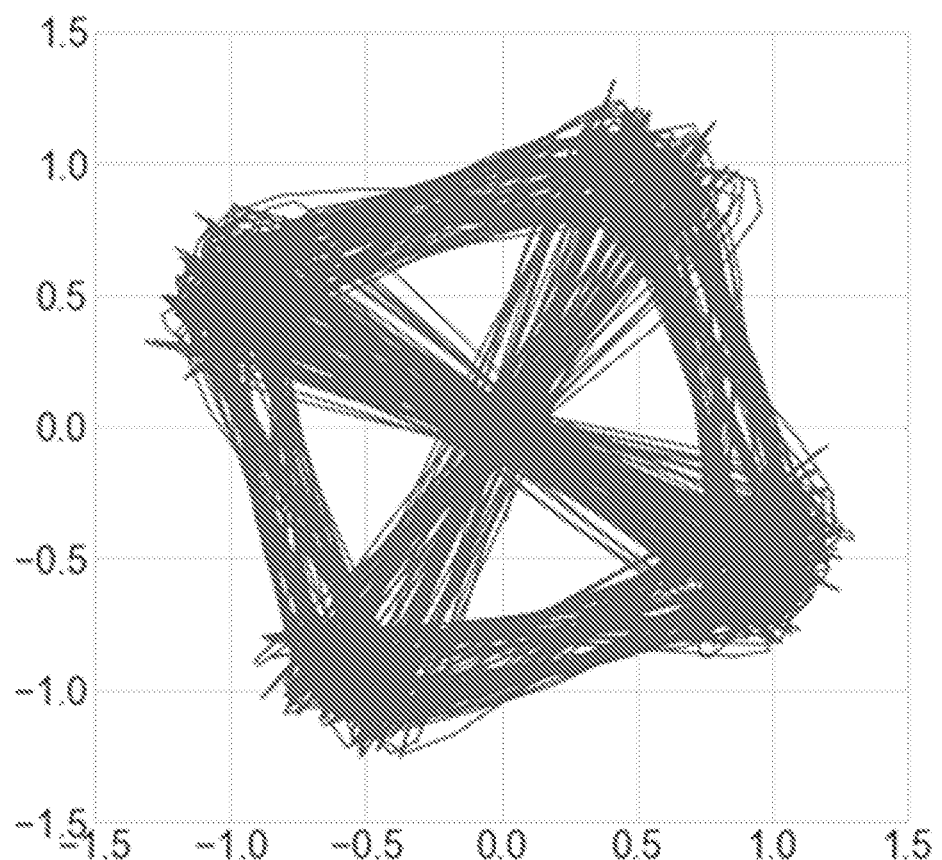
FIG. 1 is a graph in which an I component and a Q component of a baseband signal are displayed with coordinates when center frequencies are matched.
Figure 2:
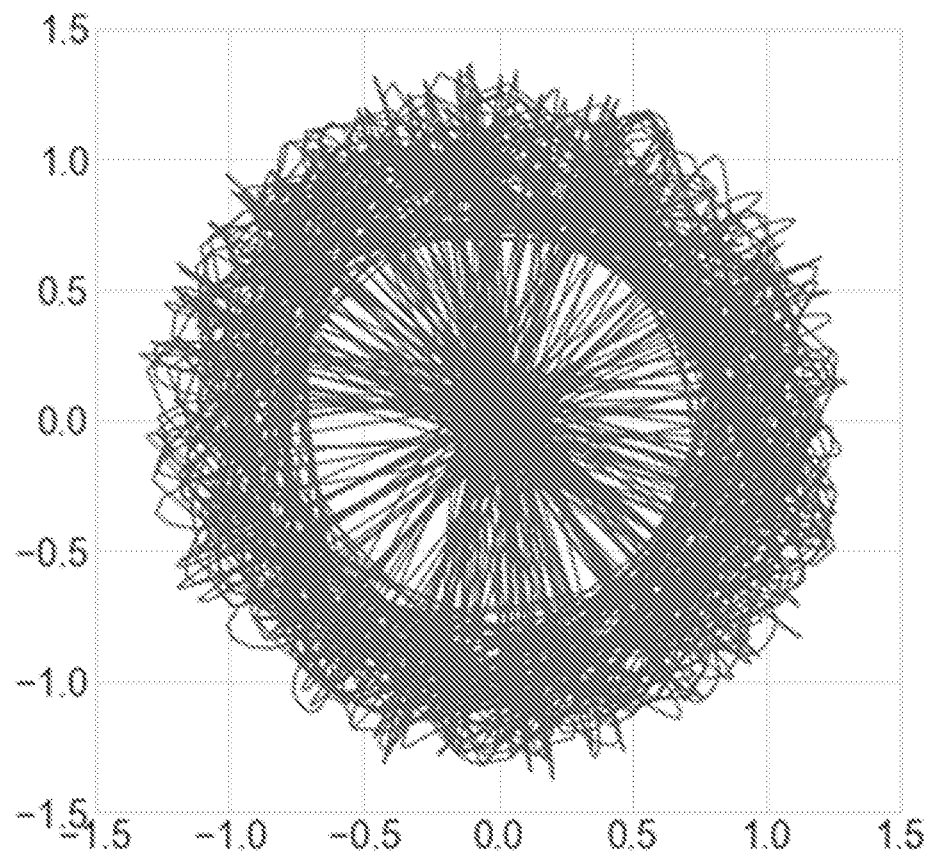
FIG. 2 is a graph in which an I component and a Q component of a baseband signal are displayed with coordinates when center frequencies are not matched.

In the description of the following example embodiments, examinations made by the inventor will be described. First, technical problems related to Japanese Unexamined Patent Application Publication No. 2008-211760 will be described in detail, and then problems in the related technique using machine learning will be described.

First, the technique according to Japanese Unexamined Patent Application Publication No. 2008-211760 will be described. Japanese Unexamined Patent Application Publication No. 2008-211760 discloses a technique for accurately checking a center frequency and analyzing a pattern of a baseband signal. A modulation format estimation unit according to Japanese Unexamined Patent Application Publication No. 2008-211760 performs format estimation from a symbol pattern of a received signal. A center frequency and a symbol rate of the received signal are required for symbol extraction from the received signal, but such information is estimated by spectrum analysis in Japanese Unexamined Patent Application Publication No. 2008-211760. Statistical data of several thousand symbols or more is required for analysis of the symbol pattern.

The technical problems related to Japanese Unexamined Patent Application Publication No. 2008-211760 will be described below. The modulation format estimation unit statistically analyzes the pattern of the baseband signal and estimates the modulation format. To that end, the center frequency needs to be corrected accurately. Therefore, a frequency deviation/transmission rate estimation unit in Japanese Unexamined Patent Application Publication No. 2008-211760 estimates with high accuracy by accumulating the received signal for a long time and performing spectrum analysis. For example, when a modulation format estimation target includes a 64 quadrature amplitude modulation (QAM) signal, since a place where a distance between the symbols is only 16 degrees exists in the 64 QAM, a phase rotation during acquisition of the statistical data needs to be kept within a single-digit degree in consideration of dispersion of constellation due to noise. This means that a frequency error of only a few Hz is allowed in a case of estimating a modulation signal with a modulation bandwidth of 1 MHz. Further, since noise reduction is also performed by averaging at the time of the spectrum analysis, signal data in seconds is required for frequency shift correction according to such a technique.

Therefore, according to such a technique, since correction accuracy of the center frequency cannot be sufficiently obtained at the time of the signal reception in a short time, there is a problem in that a modulation format cannot be estimated for an unknown received signal with high accuracy in a short time.

The related technique using machine learning will be described below. A modulation format estimation device according to the related technique causes a machine learning model to learn a characteristic change of a baseband signal due to a center frequency shift. Here, individual signals may be short.

Figure 3:
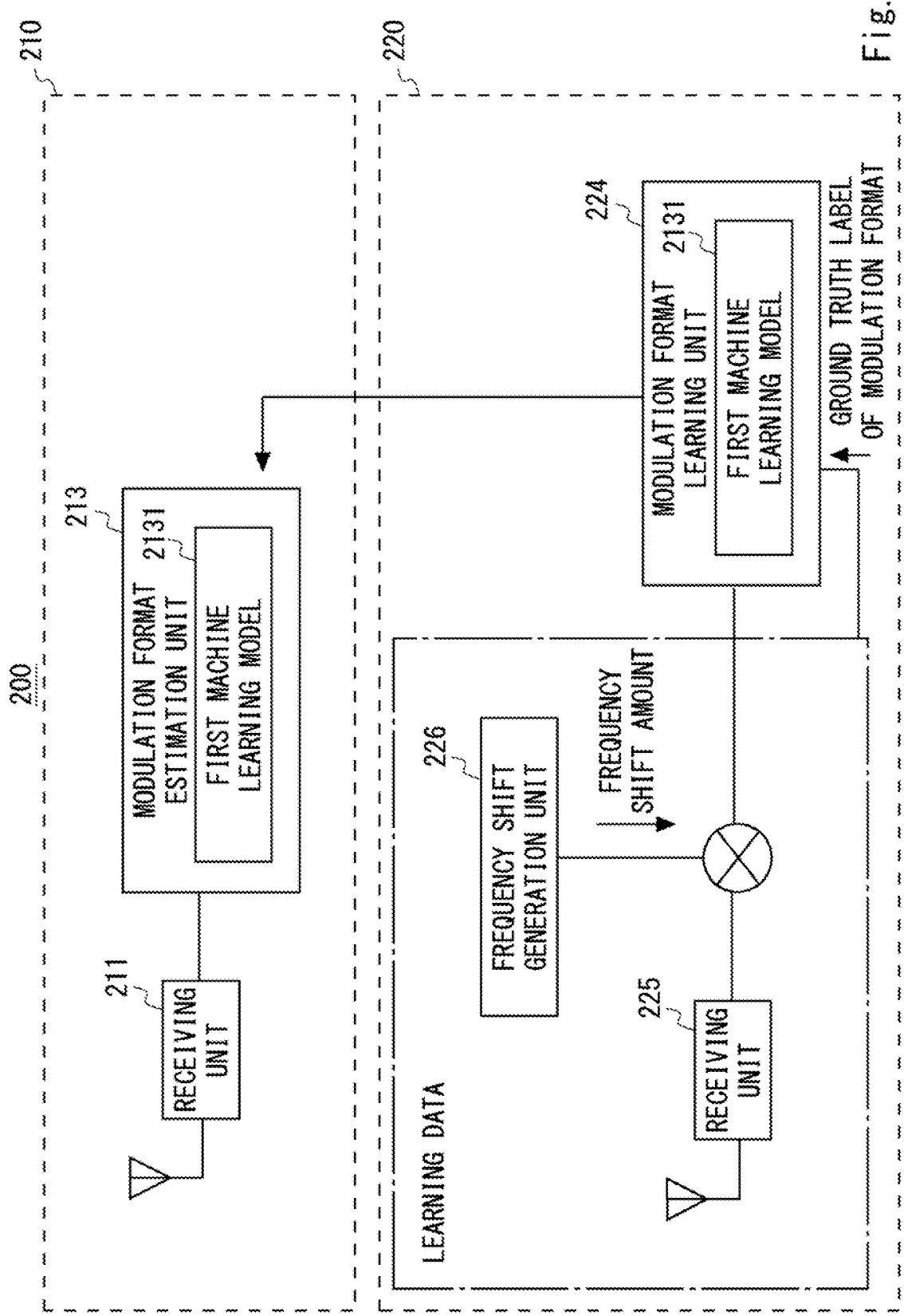
FIG. 3 is a block diagram showing a configuration of a modulation format estimation device according to a related technique.

FIG. 3 is a block diagram showing a configuration of a modulation format estimation device 200 according to the related technique. The modulation format estimation device 200 is divided into a configuration in real operation 210 and a configuration in learning 220. The real operation indicates a stage of estimating a modulation format of a received signal using a machine learning model. The learning operation indicates a stage of creating the machine learning model by machine learning using learning data. As described above, the modulation format estimation device 200 estimates the modulation format of the received signal using the machine learning model created in advance by the machine learning.

First, the real operation will be described. The configuration in real operation 210 includes a receiving unit 211 and a modulation format estimation unit 213. The receiving unit 211 acquires a baseband signal from a received signal and outputs the acquired baseband signal. The modulation format estimation unit 213 stores a first machine learning model 2131 generated at the time of learning. The first machine learning model is a learned model in which a relation between a baseband signal waveform and a modulation format is learned. The modulation format estimation unit 213 inputs the baseband signal output from the receiving unit 211 to the first machine learning model 2131, and estimates the modulation format of the received signal.

The learning operation will be described below. The configuration in learning 220 includes a receiving unit 225, a frequency shift generation unit 226, and a modulation format learning unit 224. The frequency shift generation unit 226 introduces a plurality of frequency shifts into a source signal which is received by the receiving unit 225 in the past, and generates a plurality of learning baseband signals. The modulation format learning unit 224 creates a first machine learning model 2131 by machine learning using learning data including the plurality of learning baseband signals and a ground truth label of a modulation format.

The source signal used to generate the learning baseband signal may not have to be a signal received in the past. The source signal may be a signal generated by simulation. In addition, the frequency shift generation unit 226 needs to generate the frequency shift described above so as to cover an entire monitoring band that is a target of radio monitoring.

A problem in the modulation format estimation device 200 is that an enormous amount of learning data is required when a frequency band to be monitored becomes wide. This is because there is only a slight error between the center frequency of the actually measured signal and the center frequency assumed by the receiver, and the characteristics of the baseband signal seen from the modulation format estimation unit 213 change significantly. Therefore, it is necessary to prepare signals having slightly different amounts of error from the frequency band to be monitored, and train the device. In such a case, the modulation format estimation device 200 cannot process the sufficient amount of data with realistic calculation resource, and cannot estimate the modulation format with high accuracy.

Example embodiments will be described below with reference to the drawings. Since the drawings are simply shown, the technical scope of the example embodiments should not be narrowly interpreted based on the description of the drawings. Further, the same components are designated by the same reference numerals, and will not described repeatedly.

First Example Embodiment

Figure 4:
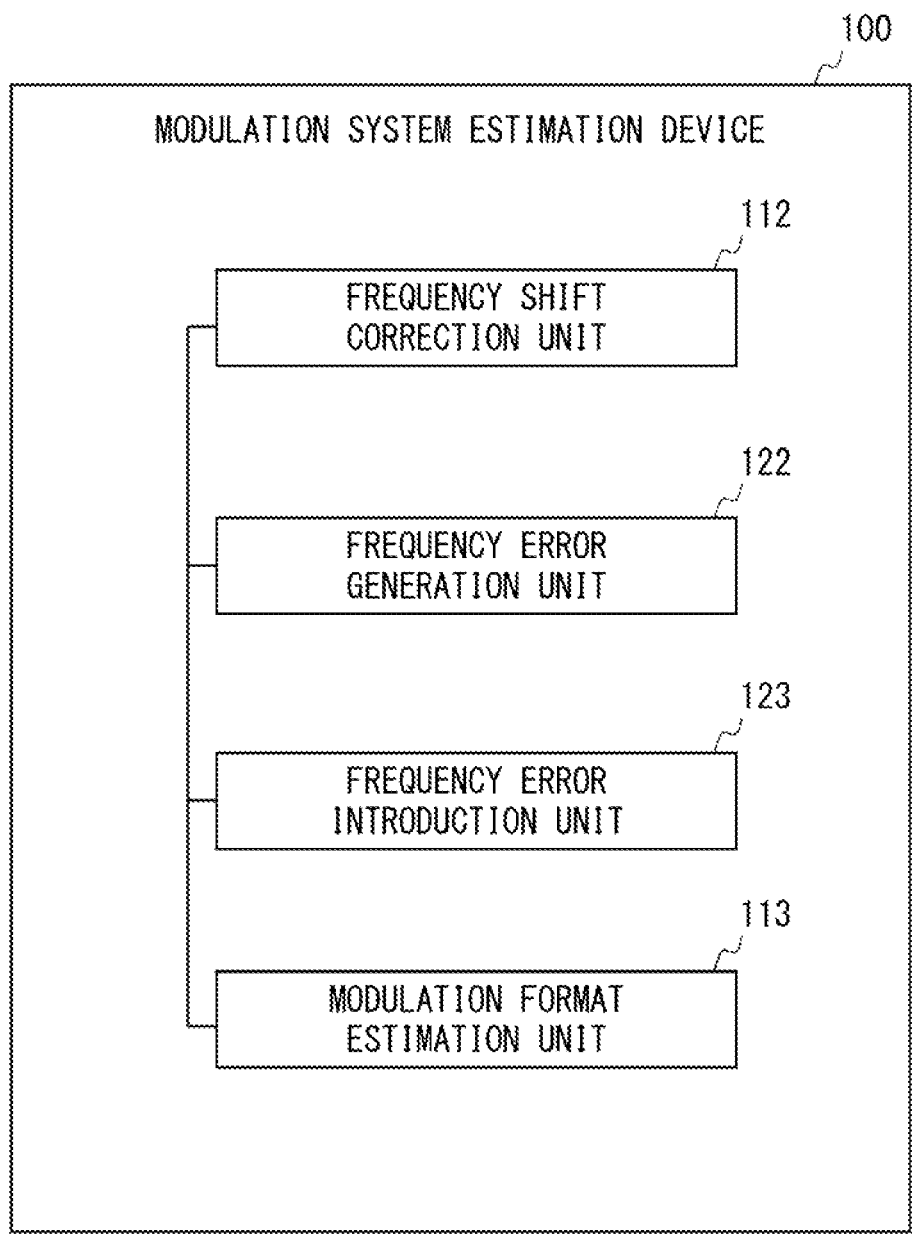
FIG. 4 is a block diagram showing a configuration of a modulation format estimation device according to a first example embodiment.

FIG. 4 is a configuration diagram showing a configuration of a modulation format estimation device 100 according to a first example embodiment. The modulation format estimation device 100 includes a frequency shift correction unit 112, a frequency error generation unit 122, a frequency error introduction unit 123, and a modulation format estimation unit 113.

The frequency shift correction unit 112 estimates the amount of a frequency shift using a baseband signal acquired from a received signal whose modulation format is unknown, and corrects the baseband signal based on the estimation result. The frequency shift correction unit 112 may estimate the frequency shift amount using a machine learning model, or may estimate the frequency shift amount by spectrum analysis. The frequency shift correction unit 112 causes the baseband signal to be subjected to a frequency shift based on the estimated frequency shift amount.

The frequency shift correction unit 112 may input the baseband signal to a second learning model in which a relation between a signal whose center frequency deviates and a frequency shift amount is learned, estimate the frequency shift amount based on the output result for the input, and correct the baseband signal based on the estimation result. Further, the frequency shift correction unit 112 may estimate the frequency shift amount based on the result of spectrum analysis of the baseband signal, and correct the baseband signal based on the estimation result, for example.

The frequency error generation unit 122 generates a plurality of frequency errors from a range set based on an error (correction error) that occurs in the estimation of the frequency shift amount. For example, when a standard deviation of the error is defined as σ, the frequency error generation unit 122 may generate a plurality of frequency errors from a range defined by 3σ. The frequency error generation unit 122 may randomly generate a plurality of frequency errors from the defined range.

The frequency error introduction unit 123 acquires a plurality of learning baseband signals in which each of the plurality of source signals modulated with different modulation formats is frequency-shifted by each frequency error. The plurality of source signals may be modulated by, for example, a binary phase shift keying (2PSK/BPSK) system, a QPSK system, an 8 phase shift keying (PSK) system, and a 64 QAM system, respectively. The frequency error introduction unit 123 may acquire a plurality of learning baseband signals from the database, or may generate a plurality of learning baseband signals by a frequency shift of the source signal.

The modulation format estimation unit 113 inputs a baseband signal corrected by the frequency shift correction unit 112 to the first machine learning model created by the machine learning using the learning data including the plurality of learning baseband signals and labels indicating the modulation formats of the respective learning baseband signals, and estimates the modulation format of the received signal based on the output result for the input.

The modulation format estimation device 100 limits the shift range of the center frequency given to the learning baseband signal, based on the error occurring in the estimation of the frequency shift amount, and causes the machine learning model to learn. Therefore, the modulation format estimation device 100 can estimate a modulation format of an unknown signal with the realistic amount of learning data.

The modulation format estimation device 100 includes a processor, a memory, and a storage device, which are not shown. In addition, the storage device stores a computer program in which the processing of the modulation format estimation method according to the present example embodiment is implemented. Then, the processor reads the computer program from the storage device into the memory and executes the computer program. Thus, the processor realizes functions of the frequency shift correction unit 112, the frequency error generation unit 122, the frequency error introduction unit 123, and the modulation format estimation unit 113.

Alternatively, each of the frequency shift correction unit 112, the frequency error generation unit 122, the frequency error introduction unit 123, and the modulation format estimation unit 113 may be realized by dedicated hardware. Further, one, some, or all of the components in each device may be realized by a general-purpose or dedicated circuitry, a processor, or a combination thereof. These components may be configured by a single chip or may be configured by a plurality of chips connected to each other via a bus. One, some, or all of the components in each device may be realized by a combination of the above-described circuitry and a program. As a processor, a central processing unit (CPU), a graphics processing unit (GPU), or a field programmable gate array (FPGA) can be used.

In addition, when one, some, or all of the components in the modulation format estimation device 100 is realized by a plurality of information processing devices and circuits, the plurality of information processing devices and circuits may be centralized or distributed in arrangement. For example, the information processing devices and circuits may be realized in a state of being connected to each other via a communication network such as a client-server system or a cloud computing system. Further, the function of the modulation format estimation device 100 may be provided in the form of SaaS (Software as a Service).

Second Example Embodiment

Figure 5:
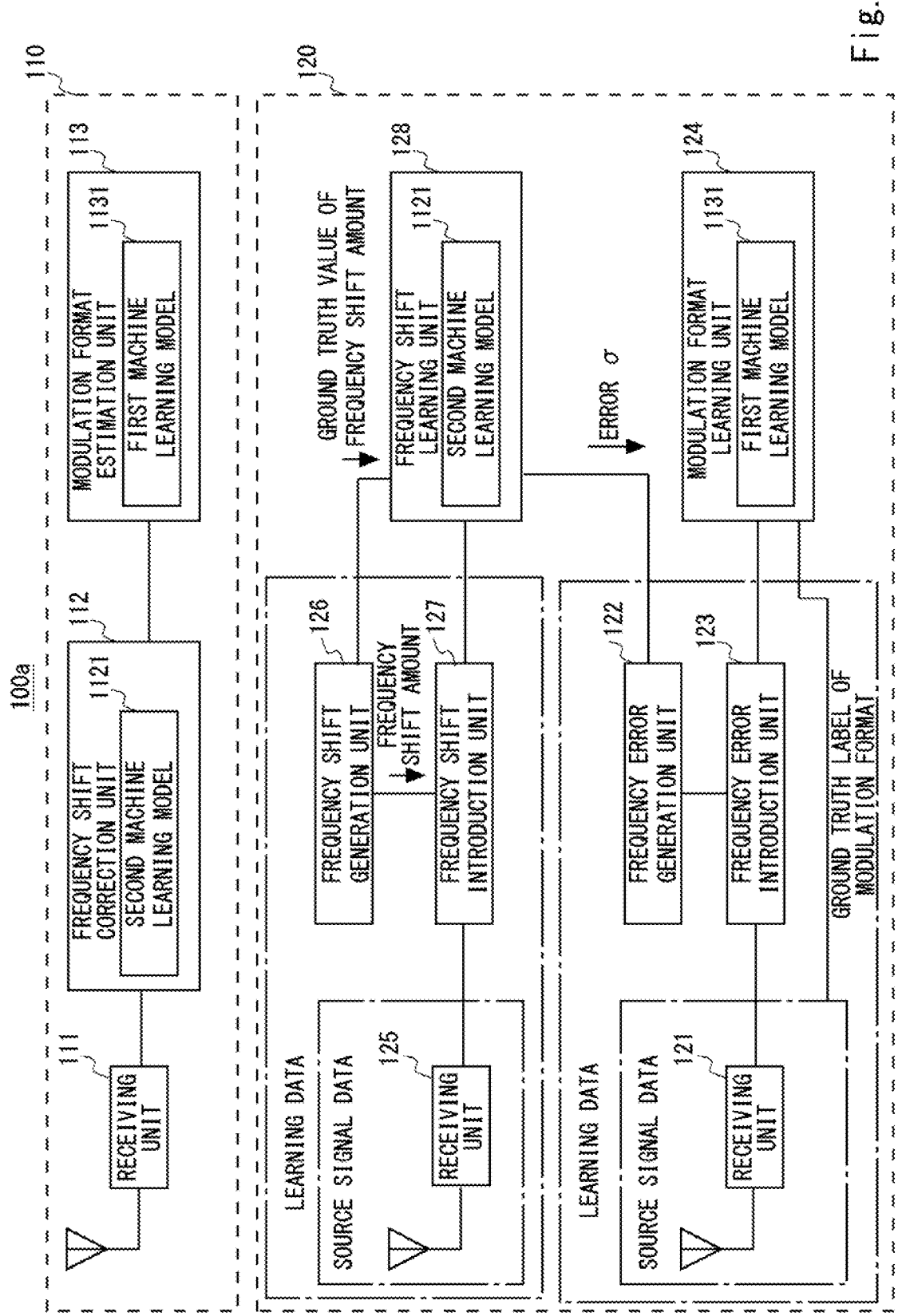
FIG. 5 is a block diagram showing a configuration of a modulation format estimation device according to a second example embodiment.

A second example embodiment is a specific example of the first example embodiment. FIG. 5 is a block diagram showing a configuration of a modulation format estimation device 100a according to the second example embodiment. The modulation format estimation device 100a is divided into a configuration in real operation 110 and a configuration in learning operation 120. The real operation indicates a stage of correcting a frequency shift using the frequency shift correction unit 112 and estimating a modulation format using the modulation format estimation unit 113. The learning operation indicates a stage of creating in advance a second machine learning model 1121 provided in the frequency shift correction unit 112 and creating in advance a first machine learning model 1131 provided in the modulation format estimation unit 113.

The configuration in real operation 110 includes a receiving unit 111, a frequency shift correction unit 112, and a modulation format estimation unit 113. The receiving unit 111 receives a received signal whose modulation format is unknown, acquires a baseband signal from the received signal, and outputs the acquired baseband signal to the frequency shift correction unit 112.

The frequency shift correction unit 112 includes the second machine learning model 1121 created at the time of learning. The second machine learning model 1121 is a learned model in which a relation between a signal waveform and a frequency shift amount is learned. A method of creating the second machine learning model 1121 will be described later. The frequency shift correction unit 112 inputs the baseband signal, which is output from the receiving unit 111, to the second machine learning model 1121, and estimates the frequency shift amount based on the output result for the input. Then, the frequency shift correction unit 112 causes the baseband signal to be subjected to a frequency shift based on the estimation result, and outputs a baseband signal corrected by the frequency shift correction unit 112.

The modulation format estimation unit 113 includes the first machine learning model 1131 created at the time of learning. The first machine learning model 1131 is a learned model in which a relation between a signal waveform and a modulation format is learned. A method of creating the first machine learning model 1131 will be described later. The modulation format estimation unit 113 inputs the corrected baseband signal, which is corrected by the frequency shift correction unit 112, to the first machine learning model 1131, and estimates a modulation format of the received signal based on the output result for the input.

The configuration in learning operation 120 includes a receiving unit 125, a frequency shift generation unit 126, a frequency shift introduction unit 127, a frequency shift learning unit 128, a receiving unit 121, a frequency error generation unit 122, a frequency error introduction unit 123, and a modulation format learning unit 124. As will be described later, the configuration in learning operation 120 may not include the receiving units 121 and 125.

The receiving unit 125 outputs the baseband signal, which is acquired from the signal received at the time of collection of learning data, to the frequency shift introduction unit 127 as source signal data. The source signal data is preferably a signal without a frequency shift, but may be a signal with a frequency shift as long as the magnitude of the frequency shift is known in advance. The source signal data may be a signal generated by simulation. In other words, the receiving unit 125 is only one means for acquiring learning data, and the first example embodiment may include a configuration not including the receiving unit 125.

The frequency shift generation unit 126 generates a frequency shift amount to be introduced to the source signal, and outputs it to the frequency shift introduction unit 127. Further, the frequency shift generation unit 126 outputs the frequency shift amount, which is a ground truth value in the machine learning, to the frequency shift learning unit 128. When the source signal data is frequency-shifted, the sum of the frequency shift amount of the source signal data and the frequency shift amount generated by the frequency shift generation unit 126 is output to the frequency shift learning unit 128 as a ground truth value in the machine learning.

The frequency shift introduction unit 127 introduces the frequency shift generated by the frequency shift generation unit 126 into the source signal, and outputs it to the frequency shift learning unit 128.

The frequency shift learning unit 128 creates the second machine learning model 1121 by machine learning using multiple learning data including the signal data output by the frequency shift introduction unit 127 and the frequency shift amount output by the frequency shift generation unit 126. The frequency shift learning unit 128 statistically calculates an error σ from the ground truth value and the correction value, and outputs it to the frequency error generation unit 122. The error σ is also called a correction error. Details of the machine learning will be described later.

The receiving unit 121 outputs the baseband signal, which is acquired from the signal received at the time of collection of the learning data, to the frequency error introduction unit 123 as source signal data. Then, the modulation format of the baseband signal is output to the modulation format learning unit 124, as a ground truth label in the machine learning. The source signal data is preferably a baseband signal without a frequency shift, but may be a signal with a frequency shift as long as the magnitude of the frequency shift is known in advance. The source signal data may be generated by simulation. In other words, the receiving unit 121 is only one means for acquiring learning data, and the first example embodiment may include a configuration not including the receiving unit 121. The source signal may be acquired from a database of baseband signals received in the past or a database of signals generated by simulation.

For example, the frequency error generation unit 122 changes the center frequency within a range of 3σ determined by the error σ, and outputs the generated frequency error to the frequency error introduction unit 123. The frequency error introduction unit 123 introduces the generated frequency error into the source signal, and outputs it to the modulation format learning unit 124, as a learning data. When the source signal data is frequency-shifted, the sum of the frequency shift amount of the source signal data and the frequency error generated by the frequency error generation unit 122 is adjusted so as to change within the range of 3σ.

The modulation format learning unit 124 creates the first machine learning model 1131 by machine learning using learning data including the signal output by the frequency error introduction unit 123 and the label indicating the modulation format of the source signal. Details of the machine learning will be described later.

Figure 6:
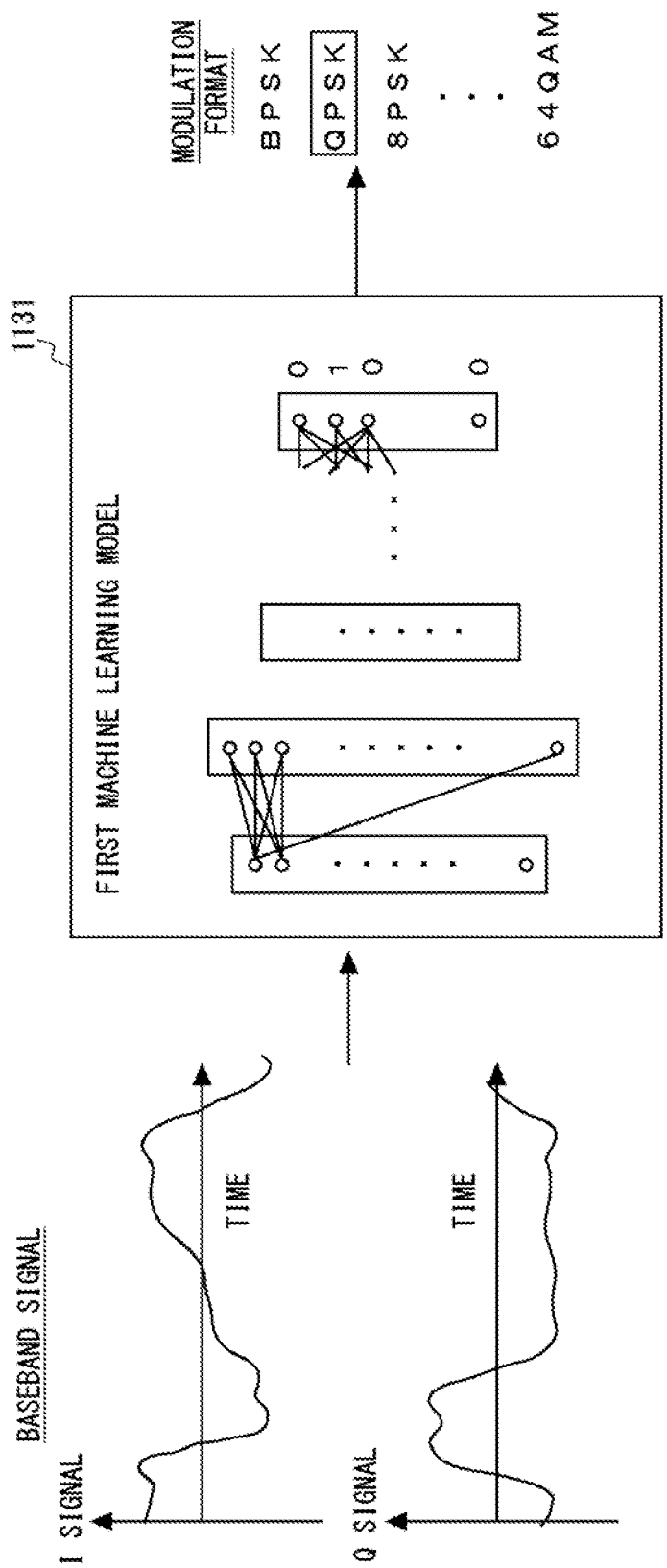
FIG. 6 is a schematic diagram showing an outline of machine learning in a first machine learning model.

The first machine learning model 1131 will be described in detail with reference to FIG. 6. The first machine learning model 1131 created by the modulation format learning unit 124 is a machine learning model in which a flag indicating an estimated modulation format is returned when a baseband signal in wireless communication is input. The baseband signal may be a combination of an I signal and a Q signal. Here, the I signal represents an in-phase signal, and the Q signal represents a quadrature-signal. Examples of the modulation format to be estimated include the BPSK system, the QPSK system, the 8 PSK system, and the 64 QAM system. The modulation format learning unit 124 receives the baseband signal and the flag indicating the ground truth of the modulation format, and adjusts internal parameters of the first machine learning model 1131 such that the ground truth can be derived.

Figure 7:
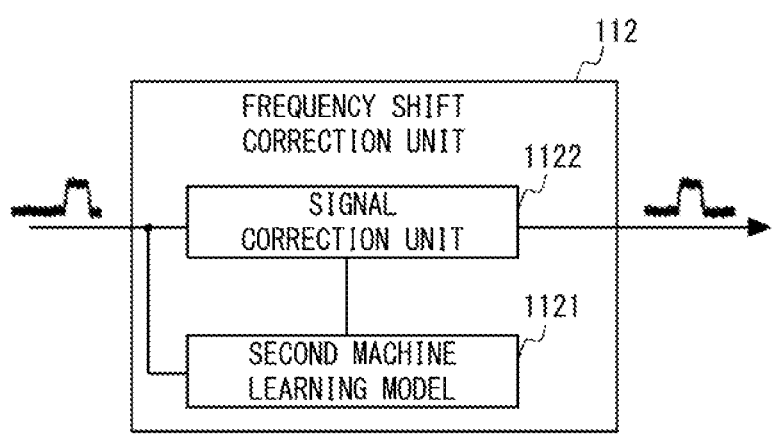
FIG. 7 is a block diagram showing a configuration of a frequency shift correction unit.

The second machine learning model 1121 will be described in detail below. FIG. 7 is a block diagram showing a detailed functional configuration of the frequency shift correction unit 112. The frequency shift correction unit 112 includes a second machine learning model 1121 and a signal correction unit 1122. The second machine learning model 1121 is also referred to as a frequency-shift-amount estimation unit. The signal correction unit 1122 causes the baseband signal to be frequency-shifted based on the estimation result of the second machine learning model 1121.

Similarly to the frequency shift correction unit 112 in the real operation, the frequency shift learning unit 128 at the time of learning includes a second machine learning model 1121 and a signal correction unit 1122. The frequency shift learning unit 128 outputs an estimation error $\sigma$ to the second machine learning model 1121.

Figure 8:
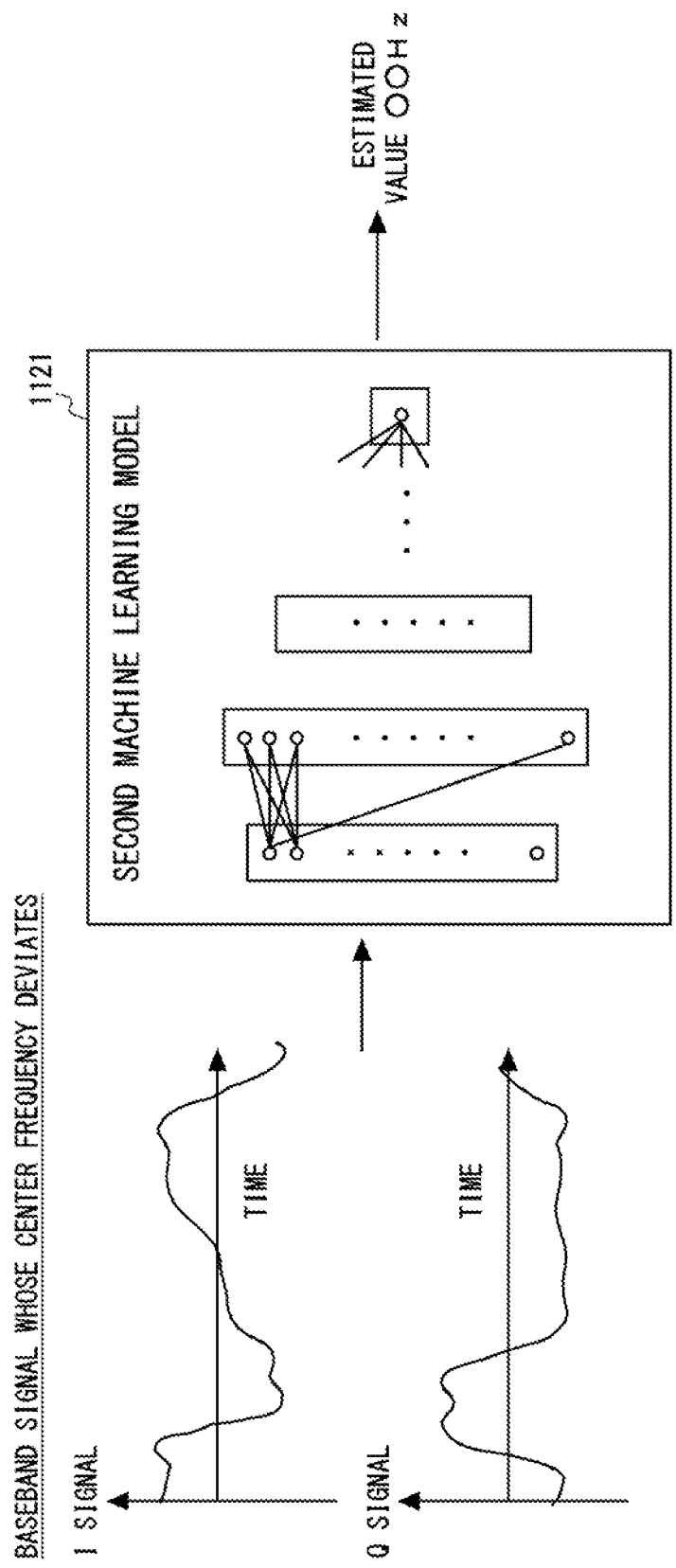
FIG. 8 is a schematic diagram showing an outline of machine learning in a second machine learning model.

As shown in FIG. 8, the second machine learning model 1121 returns a frequency shift amount (Hz) when a baseband signal with a deviating center frequency is input. At the time of learning, the frequency shift learning unit 128 delivers the baseband signal and the answer of the frequency shift amount to the second machine learning model 1121 and adjusts parameters in the second machine learning model 1121 such that the answer can be derived. The error $\sigma$ is calculated as a result of collecting statistics on a difference between the estimated value of the frequency shift amount and the answer of the frequency shift amount after the adjustment of the internal parameters of the second machine learning model 1121 is completed.

Figure 9:
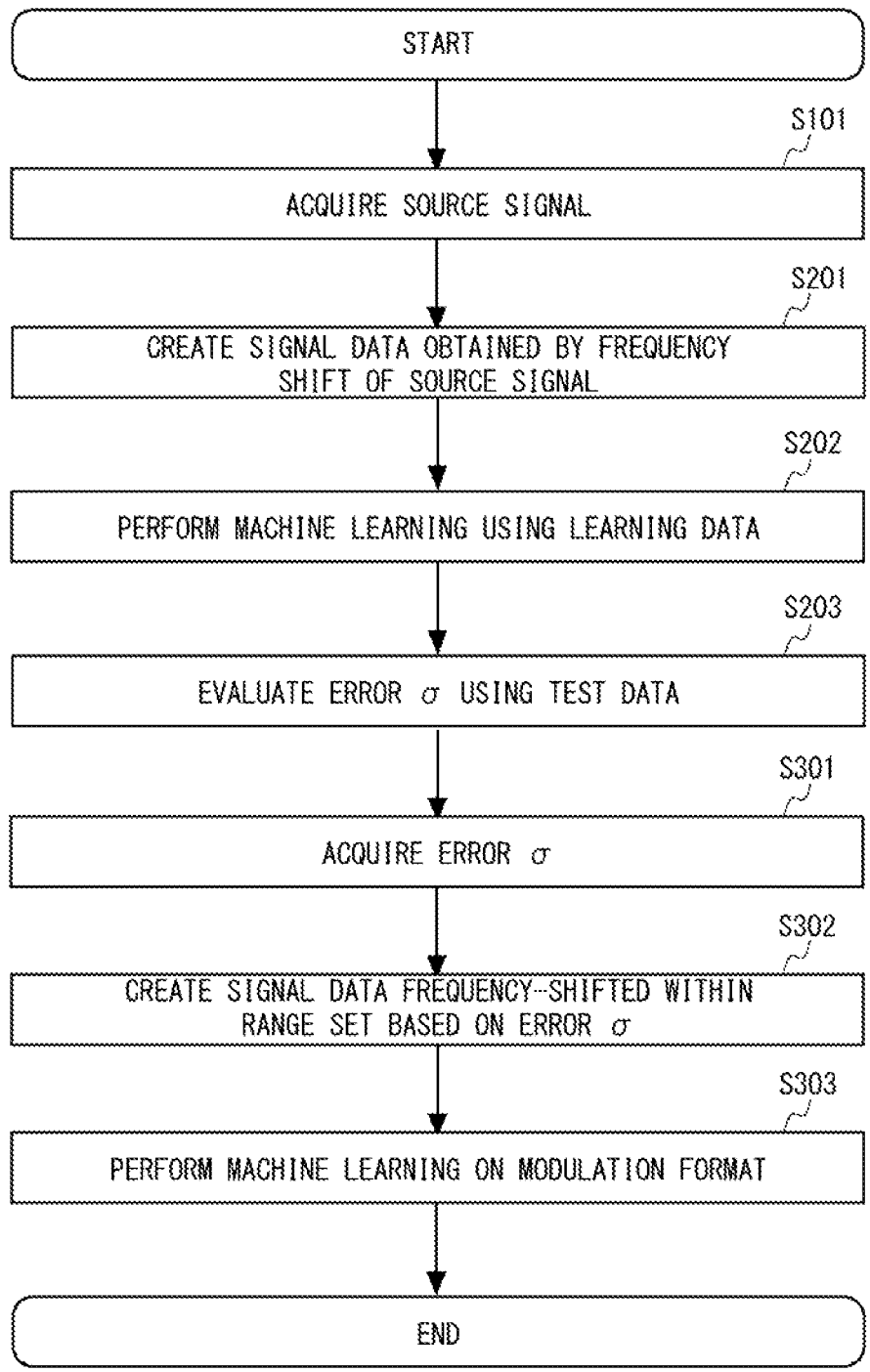
FIG. 9 is a flowchart showing a flow of a modulation format estimation method according to the second example embodiment.

A method of creating the machine learning model will be described below with reference to FIG. 9. First, a source signal used for learning and testing is acquired (step S101). The source signal is a modulation signal (attached with a ground truth tag indicating the modulation format) which is used for learning by the frequency shift learning unit 128 and the modulation format learning unit 124. The ground truth tag is also referred to as a label. Here, the center frequency of the source signal may or may not be shifted. In the following description, it is assumed that the center frequency is not shifted.

A method of creating the second machine learning model 1121 will be described below. First, the frequency shift introduction unit 127 creates signal data (attached with a ground truth tag indicating the frequency shift amount) obtained by a frequency shift of the source signal (step S201). Here, a range of the frequency shift amount is set within a range in which radio monitoring is performed. The signal data created in step S201 is divided into learning data and test data, and the frequency shift learning unit 128 performs machine learning using the learning data (step S202). The second machine learning model 1121 after machine learning is used in the real operation. Finally, the frequency shift learning unit 128 evaluates an error $\sigma$ in estimating the frequency shift amount using the test data (step S203). The error $\sigma$ is also referred to as a correction error or an estimation error.

A method of creating the first machine learning model 1131 will be described below. First, the frequency error generation unit 122 receives an error $\sigma$ of the frequency shift amount from the frequency shift learning unit 128 (step S301). Next, the frequency error generation unit 122 determines, based on the error $\sigma$, a range of the frequency shift amount to be treated by the first machine learning model 1131 (for example, determines to be 3$\sigma$), and creates signal data obtained by the frequency shift of the source signal within the range (step S302). Finally, the modulation format learning unit 124 performs machine learning with the frequency-shifted signal data (step S303). The first machine learning model 1131 after machine learning is used in the real operation.

Effects of the present disclosure will be described below. The effects of the disclosure are verified using a received signal having a modulation bandwidth of 200 kHz and a signal data length of 640 μs. A verification condition corresponds to a data length of 128 μs at a modulation bandwidth of 1 MHz.

Figure 10:
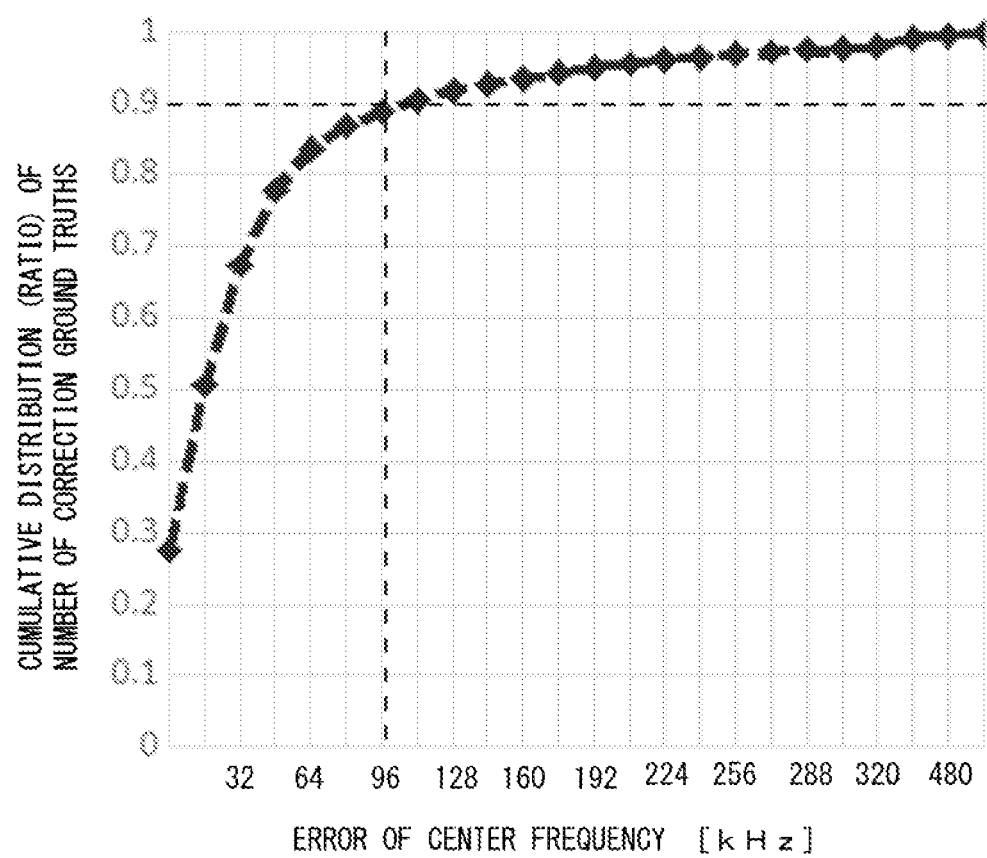
FIG. 10 is a graph showing correction accuracy of a frequency shift by the second example embodiment.

FIG. 10 is a graph showing estimation accuracy of the frequency shift amount by the modulation format estimation device 100*a*. A vertical axis shows a cumulative distribution (ratio) of the number of ground truths of the frequency shift amount, and a horizontal axis shows an error [kHz] in the estimation of the frequency shift amount. For example, referring to a point where the cumulative distribution is 0.9, it can be seen that a ground truth rate of 90% can be secured if an estimation error of 48% is allowed for the modulation bandwidth.

Figure 11:
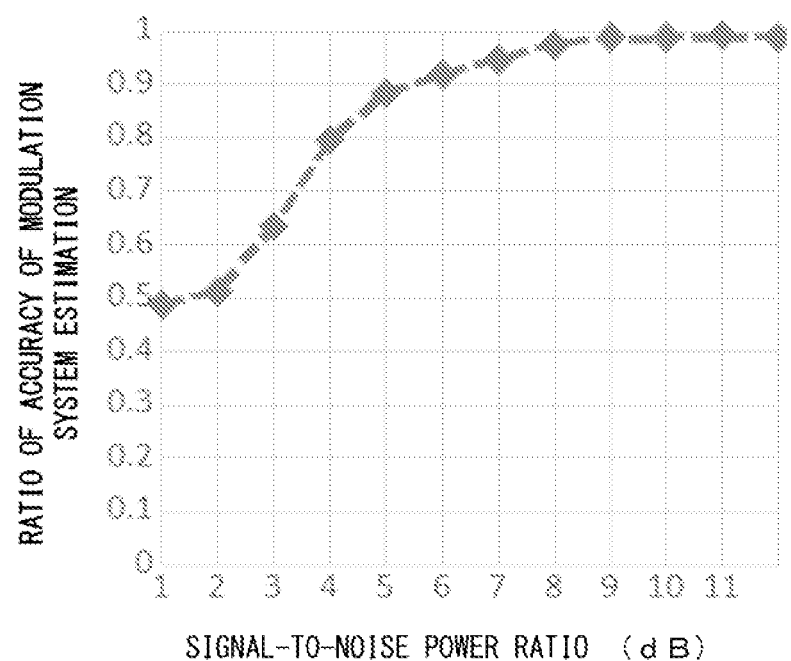
FIG. 11 is a graph showing estimation accuracy of a modulation format by the second example embodiment.

FIG. 11 is a graph showing estimation accuracy of the modulation format by the modulation format estimation device 100*a*. A vertical axis shows accuracy (ratio) of the modulation format estimation, and a horizontal axis shows a signal-to-noise power ratio [dB]. It was found from FIG. 11 that sufficient estimation accuracy can be obtained by the modulation format estimation device 100*a*.

As a result of the verification, it was found that the modulation format estimation device 100*a* has sufficient accuracy of the modulation format estimation even when the error in the estimation of the frequency shift amount is large. Further, according to the modulation format estimation device 100*a*, the signal data length required for estimating the modulation format can be shortened by about three digits compared with the case where the technique disclosed in Japanese Unexamined Patent Application Publication No. 2008-211760 is used.

Third Example Embodiment

Similarly to the second example embodiment, a third example embodiment is also a specific example of the first example embodiment. A modulation format estimation device 100*b* according to the third example embodiment estimates the frequency shift amount of the baseband signal using spectrum analysis instead of the machine learning model.

Figure 12:
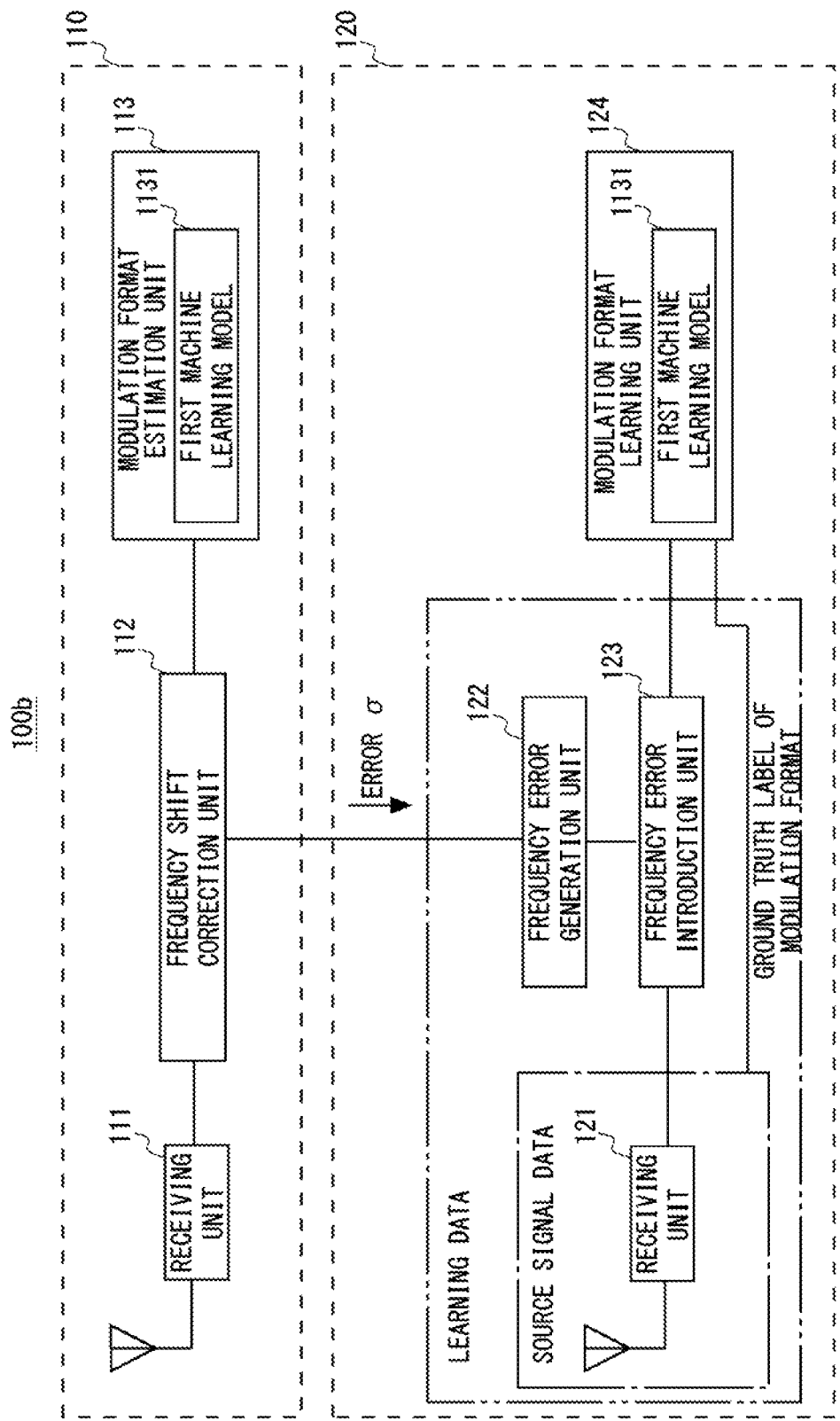
FIG. 12 is a block diagram showing a configuration of a modulation format estimation device according to a third example embodiment.

FIG. 12 is a block diagram showing a configuration of the modulation format estimation device 100b according to the third example embodiment. Similarly to the second example embodiment, the configuration of the modulation format estimation device 100b is divided into a configuration in real operation 110 and a configuration in learning operation 120. The configuration in real operation 110 includes a receiving unit 111, a frequency shift correction unit 112, and a modulation format estimation unit 113. The configuration in learning operation 120 includes a receiving unit 121, a frequency error generation unit 122, a frequency error introduction unit 123, and a modulation format learning unit 124. Differences from the second example embodiment will be described below.

The frequency shift correction unit 112 performs spectrum analysis on the baseband signal output by the receiving unit 111, and estimates the frequency shift amount. The frequency shift correction unit 112 may estimate, for example, an average of two points where a predetermined threshold value and a spectrum intersect, as the frequency shift amount. Then, the frequency shift correction unit 112 performs calibration or the like to self-diagnose the error σ in advance. The error σ is also referred to as a correction error. The frequency shift correction unit 112 may estimate, for example, the frequency shift amount for the baseband signal having a known frequency shift amount, and calculate a difference from the real frequency shift amount to use the difference as the error σ. Here, the frequency shift correction unit 112 may calculate the error σ using a plurality of baseband signals having known frequency shift amounts.

The frequency error generation unit 122 adjusts an error generation width (range) according to the error σ calculated by the frequency shift correction unit 112. The modulation format learning unit 124 creates a first machine learning model 1131 by machine learning in the frequency range based on the error σ.

Since the modulation format estimation device 100b performs machine learning in consideration of the error σ, it is possible to maintain estimation accuracy in the estimation of modulation format even when an error occurs in the estimation of the frequency. Therefore, as in the second example embodiment, the modulation format estimation device 100b can also estimate the modulation format from the baseband signal even when the signal data length is shortened by about three digits compared with Japanese Unexamined Patent Application Publication No. 2008-211760.

Fourth Example Embodiment

The machine learning model may be created (trained) and updated by a service provider in addition to on-premises. In this case, the service provider asks a user to provide actual measurement data of unlicensed radio waves, and relearns a machine learning model based on the actual measurement data.

In other words, the user estimates a modulation format of an unknown radio signal using the provided machine learning model. In addition, the user accumulates the signal data of the observed unlicensed radio waves and provides it to a service provider. On the other hand, the service provider uses the provided signal data to relearn the machine learning model and improve the structure of the machine learning model. The service provider provides the improved machine learning model to the user.

Figure 13:
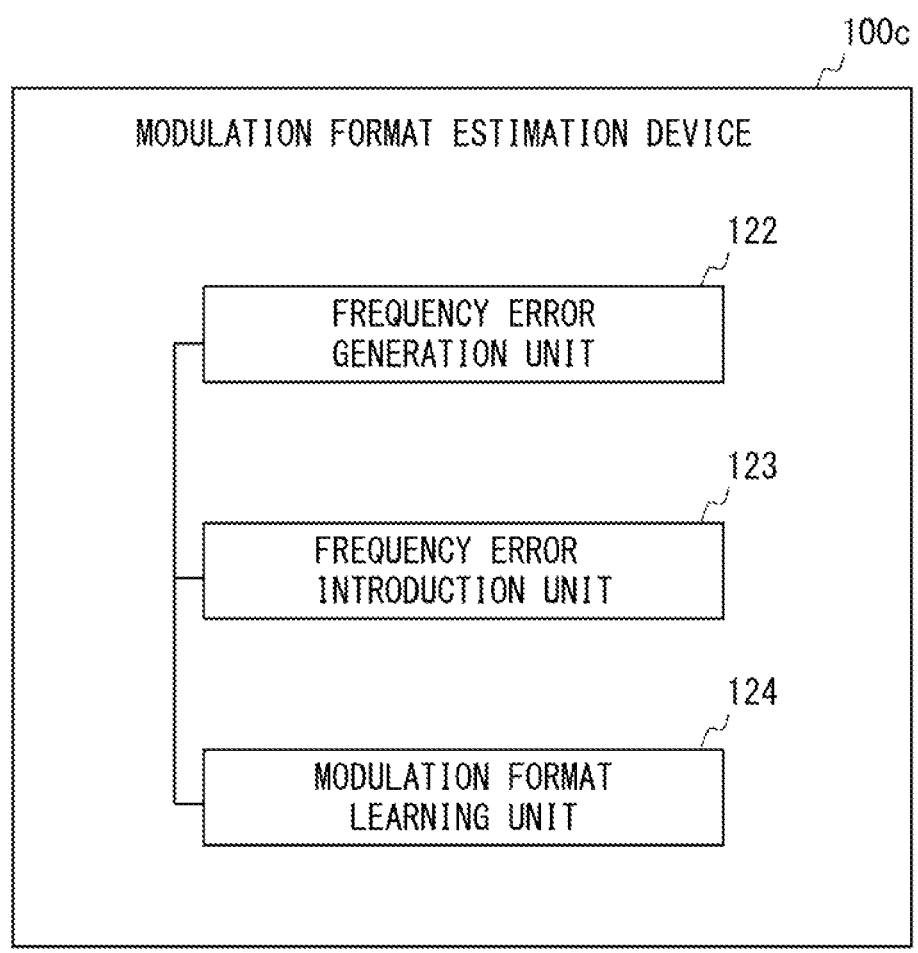
FIG. 13 is a block diagram showing a configuration of a modulation format estimation device according to a fourth example embodiment.

A modulation format estimation device 100c according to the fourth example embodiment is used when the service provider creates the machine learning model, and includes a frequency error generation unit 122, a frequency error introduction unit 123, and a modulation format learning unit 124 as shown in FIG. 13.

The frequency error introduction unit 123 generates a plurality of frequency errors from a range set based on an error occurring in the estimation of the frequency shift amount of the baseband signal acquired from the received signal whose modulation format is unknown. The frequency error introduction unit 123 acquires a plurality of learning baseband signals in which a plurality of source signals modulated by different modulation formats are frequency-shifted by frequency errors, respectively. The modulation format learning unit 124 creates a first machine learning model by machine learning using learning data including the plurality of learning baseband signals and labels indicating the modulation formats of the respective learning baseband signals.

The modulation format estimation device 100c according to the fourth example embodiment can create a machine learning model in which a modulation format is estimated with high accuracy.

The present disclosure is not limited to the above example embodiments, and can be appropriately modified without departing from the gist.

According to the present disclosure, it is possible to estimate the modulation format of the radio signal having an unknown center frequency at high speed and with high accuracy.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Part of or all the foregoing embodiments can be described as in the following appendixes, but the present disclosure is not limited thereto.

(Supplementary Note 1)

1. A modulation format estimation device comprising:
a frequency shift correction unit configured to estimate the amount of a frequency shift using a baseband signal acquired from a received signal of which modulation format is unknown and correct the baseband signal based on an estimation result;

a frequency error generation unit configured to generate a plurality of frequency errors from a range set based on an error occurring in the estimation of the frequency shift amount;

a frequency error introduction unit configured to acquire a plurality of learning baseband signals in which each of a plurality of source signals modulated by different modulation formats is frequency-shifted by each frequency error; and a modulation format estimation unit configured to input a baseband signal corrected by the frequency shift correction unit to a first machine learning model created by machine learning using learning data including the plurality of learning baseband signals and a label indicating a modulation format of each of the learning baseband signals, and estimate a modulation format of the received signal based on an output result for the input.

(Supplementary Note 2)

2. The modulation format estimation device according to Supplementary Note 1, wherein the frequency shift correction unit is configured to input the baseband signal to a second learning model in which a relation between a signal of which center frequency deviates and a frequency shift amount is learned, estimate the frequency shift amount based on an output result for the input, and correct the baseband signal based on an estimation result.

(Supplementary Note 3)

3. The modulation format estimation device according to Supplementary Note 1, wherein the frequency shift correction unit is configured to estimate the frequency shift amount based on a result of spectrum analysis of the baseband signal, and correct the baseband signal based on an estimation result.

(Supplementary Note 4)

4. The modulation format estimation device according to any one of Supplementary Note 1 to 3, wherein the frequency error generation unit is configured to randomly generate the plurality of frequency errors from the range.

(Supplementary Note 5)

5. A modulation format estimation method comprising:

a frequency shift correction step of estimating the amount of a frequency shift using a baseband signal acquired from a received signal of which modulation format is unknown, and correcting the baseband signal based on an estimation result;

a frequency error generation step of generating a plurality of frequency errors from a range set based on an error occurring in the estimation of the frequency shift amount;

a frequency error introduction step of acquiring a plurality of learning baseband signals in which each of a plurality of source signals modulated by different modulation formats is frequency-shifted by each frequency error; and a modulation format estimation step of inputting a baseband signal corrected by the frequency shift correction step to a first machine learning model created by machine learning using learning data including the plurality of learning baseband signals and a label indicating a modulation format of each of the learning baseband signals, and estimating a modulation format of the received signal based on an output result for the input.

(Supplementary Note 6)

6. A non-transitory computer readable medium storing a program for causing a computer to execute:

a frequency shift correction step of estimating the amount of a frequency shift using a baseband signal acquired from a received signal of which modulation format is unknown, and correcting the baseband signal based on an estimation result;

a frequency error generation step of generating a plurality of frequency errors from a range set based on an error occurring in the estimation of the frequency shift amount;

a frequency error introduction step of acquiring a plurality of learning baseband signals in which each of a plurality of source signals modulated by different modulation formats is frequency-shifted by each frequency error; and a modulation format estimation step of inputting a baseband signal corrected by the frequency shift correction step to a first machine learning model created by machine learning using learning data including the plurality of learning baseband signals and a label indicating a modulation format of each of the learning baseband signals, and estimating a modulation format of the received signal based on an output result for the input.

(Supplementary Note 7)

7. A modulation format estimation device comprising:

a frequency error generation unit configured to generate a plurality of frequency errors from a range set based on an error occurring in an estimation of the amount of a frequency shift using a baseband signal acquired from a received signal of which modulation format is unknown;

a frequency error introduction unit configured to acquire a plurality of learning baseband signals in which each of a plurality of source signals modulated by different modulation formats is frequency-shifted by each frequency error; and a modulation format learning unit configured to create a first machine learning model by machine learning using learning data including the plurality of learning baseband signals and a label indicating a modulation format of each of the learning baseband signals.

(Supplementary Note 8)

8. The modulation format estimation device according to Supplementary Note 7, further comprising a frequency shift learning unit configured to create a second learning model in which a relation between a signal of which center frequency deviates and a frequency shift amount is learned.

What is claimed is:

1. A modulation format estimation device comprising:
at least one memory storing instructions, and
at least one processor configured to execute the instructions to:
estimate an amount of a frequency shift of a baseband signal acquired from a received signal of which a modulation format is unknown;
correct the baseband signal based on the estimated amount of the frequency shift;
generate a plurality of frequency errors from a range set based on an error in the estimated amount of the frequency shift;
acquire a plurality of learning baseband signals in which each of a plurality of source signals modulated by different modulation formats is frequency-shifted by each frequency error;
input the baseband signal that has been corrected based on the estimated amount of the frequency shift to a first machine learning model created by machine learning using learning data including the generated plurality of learning baseband signals and labels indicating the different modulation formats of the learning baseband signals; and estimate a modulation format of the received signal based on an output of the first machine learning model.

2. The modulation format estimation device according to claim 1, wherein the at least one processor is configured to execute the instructions to estimate by the amount of the frequency shift of the baseband signal by inputting the baseband signal to a second machine learning model that learns a relation between a signal having a center frequency that deviates and a frequency shift amount of the signal having the center frequency that deviates devices.

3. The modulation format estimation device according to claim 1, wherein the at least one processor is configured to execute the instructions to estimate the amount of the frequency shift by performing spectrum analysis on the baseband signal.

4. The modulation format estimation device according to claim 1, wherein the at least one processor is configured to execute the instructions to generate the plurality of frequency errors from the range set by randomly generating the plurality of frequency errors.

5. A modulation format estimation method comprising:
estimating an amount of a frequency shift of a baseband signal acquired from a received signal of which a modulation format is unknown and correcting the baseband signal based on the estimated amount of the frequency shift;
generating a plurality of frequency errors from a range set based on an error in the estimated amount of the frequency shift;
acquiring a plurality of learning baseband signals in which each of a plurality of source signals modulated by different modulation formats is frequency-shifted by each frequency error;
inputting the baseband signal that has been corrected based on the estimated amount of the frequency shift to a first machine learning model created by machine learning using learning data including the plurality of learning baseband signals and labels indicating the different modulation formats of the learning baseband signals; and
estimating a modulation format of the received signal based on an output of the first machine learning model.

6. A modulation format estimation device comprising:
at least one memory storing instructions; and
at least one processor configured to execute the instructions to:
generate a plurality of frequency errors from a range set based on an error in an estimated amount of frequency shift of a broadband signal acquired from a received signal of which a modulation formation is unknown;
acquire a plurality of learning baseband signals in which each of a plurality of source signals modulated by different modulation formats is frequency-shifted by each frequency error; and
create a first machine learning model by machine using learning data including the plurality of learning baseband signals and labels indicating the different modulation formats of the learning baseband signals.

7. The modulation format estimation device according to claim 6, wherein the at least one processor is configured to execute the instructions to further:
create a second learning model that learns a relation between a signal having a center frequency that deviates and a frequency shift amount of the signal having the center frequency that deviates.

* * * * *